(12) United States Patent
Roychoudhury et al.

(10) Patent No.: US 8,784,515 B2
(45) Date of Patent: Jul. 22, 2014

(54) IN-SITU COKE REMOVAL

(75) Inventors: Subir Roychoudhury, Madison, CT (US); Richard Mastanduno, Milford, CT (US); David Spence, Beacon Falls, CT (US); Jun Iwamoto, Wako (JP); Go Motohashi, Wako (JP)

(73) Assignees: Precision Combustion, Inc., North Haven, CT (US); Honda Motor Co., Ltd., Tokyo (JP)

( * ) Notice: Subject to any disclaimer, the term of this patent is extended or adjusted under 35 U.S.C. 154(b) by 855 days.

(21) Appl. No.: 12/925,143

(22) Filed: Oct. 14, 2010

(65) Prior Publication Data

US 2012/0090238 A1     Apr. 19, 2012

(51) Int. Cl.
*C10J 3/46*     (2006.01)
*B01J 7/00*     (2006.01)

(52) U.S. Cl.
USPC ........... 48/197 R; 48/61; 48/127.1; 48/127.9; 48/198.1; 48/198.7; 48/198.3; 48/75; 48/211; 48/212; 48/214 R; 48/215; 48/62 R; 48/65; 422/619; 422/625

(58) Field of Classification Search
USPC ............. 48/61, 197 R, 95, 211, 210, 65, 62 R
See application file for complete search history.

(56) References Cited

U.S. PATENT DOCUMENTS

| | | | |
|---|---|---|---|
| 2,473,525 A | 6/1949 | Hoop | |
| 4,276,150 A | 6/1981 | McHenry, Jr. | |
| 4,354,925 A | 10/1982 | Schorfheide | |
| 4,387,043 A | 6/1983 | Vickers et al. | |
| 4,701,429 A | 10/1987 | Greenwood | |
| 4,828,651 A | 5/1989 | Lumbroso et al. | |
| 4,832,921 A | 5/1989 | Greenwood | |
| 4,849,025 A | 7/1989 | Bain et al. | |
| 4,917,787 A | 4/1990 | Fukuhara et al. | |
| 4,959,126 A | 9/1990 | Tong et al. | |
| 5,043,517 A | 8/1991 | Haddad et al. | |
| 5,051,241 A | 9/1991 | Pfefferle | |

(Continued)

FOREIGN PATENT DOCUMENTS

| | | |
|---|---|---|
| EP | 0591856 A1 | 4/1994 |
| JP | 2004051437 A | 2/2004 |

(Continued)

OTHER PUBLICATIONS

European Search Report for EP Appln No. 11 18 1361; dated Nov. 22, 2011, 2 pages.

(Continued)

*Primary Examiner* — Kaity V. Handal
(74) *Attorney, Agent, or Firm* — Marie F. Zuckerman (57) ABSTRACT

A process of catalytic partial oxidation of a hydrocarbon fuel with an oxidant to produce partially-oxidized reaction products including hydrogen, with simultaneous in-situ coke removal. The process involves feeding a hydrocarbon fuel and an oxidant to a reactor in a fuel-rich feed ratio; reacting the fuel and oxidant for a fuel-rich cycle-time so as to produce a partially-oxidized reaction product; varying the fuel feed, or the oxidant feed, or both feeds to produce a fuel-lean feed to the reactor; maintaining the fuel-lean feed for a fuel-lean cycle-time sufficient to reduce coke deposits while maintaining a substantially constant yield of partially-oxidized reaction product; and alternating between the fuel-rich and fuel-lean operating cycles.

15 Claims, 2 Drawing Sheets

(56) References Cited

U.S. PATENT DOCUMENTS

| | | | |
|---|---|---|---|
| 5,087,596 | A | 2/1992 | Clark et al. |
| 5,855,742 | A | 1/1999 | Lumbroso et al. |
| 5,976,352 | A | 11/1999 | Busson et al. |
| 6,156,444 | A | 12/2000 | Smith et al. |
| 6,165,438 | A | 12/2000 | Willms et al. |
| 6,228,253 | B1 | 5/2001 | Gandman |
| 6,746,657 | B2 | 6/2004 | Castaldi |
| 6,869,456 | B2 | 3/2005 | Salemi |
| 6,887,436 | B1 | 5/2005 | Fisher et al. |
| 2003/0175198 | A1 | 9/2003 | Castaldi |
| 2004/0209205 | A1 | 10/2004 | Gomez et al. |
| 2005/0028445 | A1 | 2/2005 | Roychoudhury et al. |
| 2006/0233702 | A1 | 10/2006 | Lyubovsky et al. |
| 2007/0151154 | A1 | 7/2007 | Lyubovsky et al. |
| 2008/0127553 | A1 | 6/2008 | Roychoudhury et al. |
| 2008/0302281 | A1 * | 12/2008 | Bernard et al. ............... 110/192 |
| 2009/0012340 | A1 | 1/2009 | Choi et al. |
| 2009/0228146 | A1 | 9/2009 | Roychoudhury et al. |
| 2009/0252661 | A1 | 10/2009 | Roychoudhury |
| 2009/0293358 | A1 | 12/2009 | Roychoudhury et al. |
| 2010/0061921 | A1 | 3/2010 | Van Dijk |
| 2011/0016791 | A1 | 1/2011 | Roychoudhury et al. |

FOREIGN PATENT DOCUMENTS

| | | |
|---|---|---|
| JP | 2009249280 A | 10/2009 |
| WO | WO 9322404 A1 | 11/1993 |
| WO | WO2004060546 A2 | 7/2004 |
| WO | WO2006074552 A1 | 7/2006 |
| WO | WO 2007002599 A1 | 1/2007 |
| WO | WO 2008053007 A1 | 5/2008 |
| WO | WO2010005633 A1 | 1/2010 |

OTHER PUBLICATIONS

Notice of Reasons for Rejection, issued in JP Application No. 2011-226204, mailed Aug. 13, 2013 (counterpart JP appln).

* cited by examiner

IN-SITU COKE REMOVAL

FIELD OF THE INVENTION

The present invention relates to a method of in-situ coke removal during operation of a catalytic partial oxidation process. The term "coke removal," as used herein, shall refer to reduction and/or elimination of coke deposited within a reactor employed in the catalytic partial oxidation process, including coke deposited on a catalyst within the reactor as well as on walls, surfaces, fixtures, and conduits within the reactor. The terms "coke clean-up" and "decoking" shall be used herein in an equivalent fashion and interchangeably with the term "coke removal."

Catalytic partial oxidation processes, described hereinafter, find utility in reforming a hydrocarbon fuel to produce a value-added hydrogen-rich gaseous fuel.

BACKGROUND OF THE INVENTION

Hydrogen ($H_2$) (also referred to herein as "diatomic hydrogen") is a clean-energy fuel that has received considerable attention as an alternative to petroleum-based hydrocarbon fuels. Research is advancing hydrogen as an energy source for future applications, for example, in fuel cells, internal combustion engines, hydrogen engines, and hydrogenation engines. In addition, research efforts are being invested in the applications of hydrogen as a reducing agent for purifying harmful waste gases, such as, nitrogen oxides ($NO_x$) and sulfur oxides ($SO_x$). As a consequence, various processes are being examined for hydrogen production.

In a typical process of producing hydrogen, a hydrogen-containing molecule, such as, a hydrocarbon, an alcohol, and/or water, is decomposed using a catalytic reforming reaction, a pyrolysis reaction, or an electrolytic reaction; and the resulting hydrogen atoms combine to yield diatomic hydrogen, which is a useable higher-valued fuel. Disadvantageously, pyrolysis reactions are difficult to stabilize thermally and require extreme temperatures of greater than about 1400° C. Electrolytic reactions disadvantageously require high power consumption and offer slow reaction rates. In order to meet a growing demand for hydrogen, catalytic partial oxidation reforming processes are preferably employed to produce hydrogen fuel. Catalytic partial oxidation reforming processes advantageously avoid the problems associated with pyrolysis and electrolytic reactions.

The prior art considers hydrocarbon fuel reforming processes to be divided into three types of reactions illustrated by the following chemical equations (1) to (3). The first process is a combustion reaction, referred to as "complete oxidation," wherein steam and carbon dioxide are produced by the reaction of fuel and oxygen. Such reactions take place under fuel-lean conditions in an excess of oxygen.

$$C_nH_m+(n+¼m)O_2 \rightarrow ½mH_2O+nCO_2 \quad \text{Equation (1)}$$

If oxygen is restricted to a fuel-rich condition with less than a stoichiometric concentration of oxygen relative to fuel, a second type of process generates hydrogen and carbon monoxide through incomplete or partial oxidation of the fuel.

$$C_nH_m+½nO_2 \rightarrow ½mH_2+nCO \quad \text{Equation (2)}$$

In a third type of process, which typically occurs when oxygen concentration is substantially reduced, if not essentially zero, hydrogen is generated through the reaction of steam and fuel (known as "steam reforming").

$$C_nH_m+nH_2O \rightarrow (n+½m)H_2+nCO \quad \text{Equation (3)}$$

The reactions defined by Equations (1) and (2) are exothermic; whereas the reaction defined by Equation (3) is endothermic. Equation (2) can proceed in the absence of a catalyst, although the operating temperature of the non-catalytic process is relatively high. With use of a catalyst, the operating temperature can be lowered, and reaction product can advantageously be generated on reaction equilibrium. The catalytic partial oxidation process of this invention pertains primarily to the reforming reaction illustrated in Equation (2), wherein hydrogen is formed on contact of the fuel with the oxidant under fuel-rich conditions in the presence of a partial oxidation catalyst.

Fuels used in partial oxidation reforming processes include, for example, natural gas, ethane, propane, gasoline, light oil (diesel fuel), and alcohols, such as methanol and ethanol. A suitable reactor for catalytic partial oxidation reforming processes comprises a tube-type flow reactor, as disclosed, for example, in U.S. Pat. No. 6,869,456 B2 and U.S. Pat. No. 6,887,436 B1.

During operation of a catalytic partial oxidation process under fuel-rich conditions in a partial oxidation reactor, coke deposits on the catalyst and on the walls, surfaces, fixtures, and conduits within the interior of the reactor. The term "coke" shall refer herein to any solid carbonaceous by-product resulting from destructive distillation, refining, reforming, and/or oxidation of a petroleum-based hydrocarbon or derivative thereof. The location and quantity of coke deposits depend on many process variables, such as, temperature and flow patterns of reactant and product gases through the reactor and associated conduits. Moreover, coke deposits tend to increase as a function of process operating time (time-on-stream). The quantity of coke deposits at any given time-on-stream is difficult to measure and for all practical purposes unknown. Coke is highly detrimental to the operation of the reactor and catalyst; and if coke is not removed, it can quickly reduce the yield of desirable partially-oxidized product, such as hydrogen. Moreover, coke deposits can eventually clog conduits, nozzles, and orifices and restrict the flow of vapors through the reactor causing reactor pressure to increase to an unacceptable and potentially dangerous level.

The prior art discloses various methods for decoking catalysts and reactors. In one method, as illustrated in U.S. Pat. No. 4,701,429 and U.S. Pat. No. 4,849,025, coke is removed by means of a burn-off cycle with an oxygen-containing gas. This method requires the process of interest to be shut-down for a period of hours, during which time the burn-off cycle is implemented. Shut-down is highly undesirable, because it essentially reduces to zero the yield output of desired partially-oxidized product.

Other prior art, as illustrated in U.S. Pat. No. 4,387,043, teaches a related coke removal method involving transporting a coke-deactivated catalyst from a process reactor of interest to a separate regeneration reactor wherein coke is burned-off under oxygen. Following catalyst clean-up, the regenerated catalyst is transported back to the process reactor of interest. Aside from the complexity and problems associated with transporting solid catalysts to and from a regeneration reactor, this method does not remove coke deposits within the process reactor of interest.

Yet another method of coke removal is disclosed in U.S. Pat. Nos. 4,828,651 and 4,959,126, wherein coke is removed by flushing the coked reactor with steam or with pressurized cold water. Disadvantageously, this method also requires shut-down of the process of interest for several hours if not days, with consequential loss in yield of partially-oxidized product. Moreover, this method is not sufficiently efficient at removing all of the coke build-up.

Prior art methods are taught that attempt in-situ coke removal during operation of the process of interest. WO-A1-2006/074552, for example, discloses locating a heating means within a fuel manifold to burn-off coke within a fuel-conveying member of the manifold, so as to provide in-situ decoking of a gas turbine engine. WO-A1-2010/005633 discloses a process for on-stream decoking of a steam cracking furnace comprising multiple tube banks positioned between a hydrocarbon feedstock inlet and a convection section to radiant section crossover, the decoking process involving the steps of terminating the flow of hydrocarbon feed to at least one of the plurality of tubes and supplying a decoking feed of steam to said tube to effect coke removal.

In yet another method, illustrated in U.S. Pat. No. 4,917,787, a method is disclosed for in-situ decoking in a flame-cracking reactor (ACR process). In the ACR process a hydrocarbon fuel is combusted with oxygen to form a combustion product stream that is mixed with superheated steam to produce a heat carrier. The heat carrier is contacted with a converging hydrocarbon feedstock stream, and the combined mixture is fed into a reaction zone wherein cracking takes place. Periodically, the hydrocarbon stream is shut off, while the reactor temperature is maintained between about 1250° C. and about 1600° C., and the reactor is decoked by means of the heat carrier comprising superheated steam.

More particularly, US 2009/0252661 discloses removing carbon build-up in a reforming reactor by periodic lean operation in deep oxidation mode wherein (i) the oxidation period is on the order of milliseconds and is about 25 percent of the duration of the fuel-rich reforming period, or wherein (ii) the oxidation period is on the order of seconds and is about 10 percent of the duration of the fuel-rich reforming period. Neither of these methods provides effective coke removal while maintaining a high and steady yield of partially-oxidized reaction product.

In view of the above, the art could benefit from an improved method of coke removal during operation of a catalytic partial oxidation process for reforming a hydrocarbon fuel to form a partially-oxidized reaction product, preferably, a useable gaseous hydrogen fuel.

SUMMARY OF THE INVENTION

This invention pertains to a process of catalytic partial oxidation with in-situ coke removal, the process comprising:
(a) feeding a hydrocarbon fuel into a reactor;
(b) feeding an oxidant into the reactor, the hydrocarbon fuel and oxidant being fed in a fuel-rich feed ratio;
(c) contacting the hydrocarbon fuel and oxidant with a catalyst in the reactor for a fuel-rich cycle-time sufficient to produce at least one partially-oxidized reaction product;
(d) varying the feed of hydrocarbon fuel, or the feed of oxidant, or both feeds to the reactor to produce a fuel-lean feed ratio of hydrocarbon fuel to oxidant;
(e) maintaining the fuel-lean feed ratio for a fuel-lean cycle-time sufficient to reduce coke deposits while maintaining a substantially constant yield of partially-oxidized reaction product;
(f) varying the feed of hydrocarbon fuel, or the feed of oxidant, or both feeds to the reactor so as to provide a fuel-rich feed ratio in the manner of steps (a) and (b); and reiterating process steps (c) through (f).

The process of the invention provides for in-situ coke removal from a catalyst and the interior of a reactor during operation of a catalytic partial oxidation process for converting a hydrocarbon fuel to a partially-oxidized reaction product, preferably, a higher-value hydrogen-containing fuel, more preferably, a fuel comprising gaseous diatomic hydrogen, for example, synthesis gas ("syngas", i.e., a mixture of carbon monoxide and hydrogen). In the process of this invention coke deposits can be reduced, if not completely eliminated, thereby extending the operable time-on-stream before the catalyst needs regeneration and the reactor needs maintenance. Advantageously, the yield of desired partially-oxidized reaction product, most preferably diatomic hydrogen, remains substantially constant and is not materially disturbed by the process steps that effect coke removal. More advantageously, preferred embodiments of this invention achieve a steady average yield of partially-oxidized product of greater than about 70 mole percent. Although the process of this invention uniquely operates in alternating fuel-rich and fuel-lean feed modes, the process on average operates fuel-rich, which provides for a substantially constant yield of partially-oxidized reaction product.

Since the instant invention provides for in-situ removal of coke, the instant invention also avoids the disadvantages of conventional coke removal methods, particularly, decoking by shutting down the partial oxidation process for a separate coke burn-off or decoking via a separate steam-reforming or water flushing method, which prior art procedures take hours to implement and therefore significantly reduce the yield of partially-oxidized reaction product.

For thoroughness of description, the terms "substantially constant yield," "average yield," "cycle-time," "fuel-rich" and "fuel-lean" are defined hereinafter.

DETAILED DESCRIPTION OF THE INVENTION

As noted above, this invention pertains to a process of catalytic partial oxidation of a hydrocarbon fuel with in-situ coke removal for the purpose of providing a substantially constant yield of partially-oxidized reaction product, and preferably, a substantially constant and high average yield of valuable hydrogen-containing fuel, more preferably, a fuel comprising diatomic hydrogen. Thus, the process comprises:
(a) feeding a hydrocarbon fuel into a reactor;
(b) feeding an oxidant into the reactor, the hydrocarbon fuel and oxidant being fed in a fuel-rich feed ratio;
(c) contacting the hydrocarbon fuel and oxidant with a catalyst in the reactor for a fuel-rich cycle-time sufficient to produce at least one partially-oxidized reaction product;
(d) varying the feed of hydrocarbon fuel, or the feed of oxidant, or both feeds to the reactor to produce a fuel-lean feed ratio of hydrocarbon fuel to oxidant;
(e) maintaining the fuel-lean feed ratio for a fuel-lean cycle-time sufficient to reduce coke deposits while maintaining a substantially constant yield of partially-oxidized reaction product;
(f) varying the feed of hydrocarbon fuel, or the feed of oxidant, or both feeds to the reactor so as to provide a fuel-rich feed ratio in the manner of steps (a) and (b); and reiterating process steps (c) through (f).

For the purposes of this invention, the term "fuel-rich" shall refer to feeding the hydrocarbon fuel and the oxidant to the reactor in an equivalence ratio greater than 1:1. In contrast, the term "fuel-lean" shall refer to feeding the hydrocarbon fuel and the oxidant to the reactor in an equivalence ratio less than 1:1. The term "equivalence ratio" is defined herein as the molar ratio of hydrocarbon fuel to oxidant fed to the reactor relative to the molar ratio of hydrocarbon fuel to oxidant required for complete combustion to carbon dioxide and water ("stoichiometric ratio"). An equivalence ratio of 1:1 is the stoichiometric ratio for production of $CO_2$ and $H_2O$, as defined in Equation (1) hereinabove.

For the purposes of this invention, the term "yield of partially-oxidized reaction product" is defined as the moles of partially-oxidized reaction product, most preferably diatomic hydrogen, measured in the reactor effluent stream divided by the moles of hydrogen fed to the reactor in the form of hydrocarbon fuel, expressed as a percentage. The yield of partially-oxidized reaction product at any specific defined time may be referred to herein as the "instantaneous yield." The term "average yield of partially-oxidized reaction product" is defined as the yield of partially-oxidized reaction product averaged over the process time-on-stream. The term "process time-on-stream" refers to the total time the process has been operating when the yield is measured, typically, on the order of at least 5 minutes up to hours or days or weeks, as the case may be. Process time-on-stream is not to be confused with fuel-rich cycle-time or fuel-lean cycle-time, defined hereinafter.

The term "cycle-time" refers to one unit interval from start to finish of a particular action, the action being periodically repeated (cycled) in a plurality of unit intervals. The term "fuel-rich cycle-time" refers to a unit interval during which the hydrocarbon fuel and oxidant are fed to the reactor in a fuel-rich feed ratio, i.e., in an equivalence ratio greater than 1:1. The term "fuel-lean cycle-time" refers to a unit interval during which the hydrocarbon fuel and oxidant are fed to the reactor in a fuel-lean feed ratio, i.e., in an equivalence ratio less than 1:1. In this process fuel-rich and fuel-lean cycles are alternated periodically throughout the duration of the process time-on-stream.

As to further definitions relied upon in this description, the "maximum yield" is taken herein as the highest yield of partially-oxidized reaction product observed after inception of process operation. The maximum yield is measured after the process has reached acceptable steady state operation, so as to eliminate spikes in yield that may occur during process warm-up. The "minimum yield" is taken herein as the lowest yield of partially-oxidized reaction product observed after the maximum yield up to the time of measurement. The maximum and minimum yields are measured and compared under controlled process conditions, that is, under essentially the same fuel and oxidant feed flow rates, essentially the same fuel-rich and fuel-lean cycle-times, the same catalyst, reactor design, and other operating parameters. In each occurrence, the term "essentially the same" means that the relevant process condition (e.g., $T_{max}$ and $T_{min}$) fall within about ±5 percent of each other.

The percentage difference (% Δ) between maximum and minimum yields is calculated in Equation (4) as follows:

$$\% \Delta = 100 \times (\text{max yield} - \text{min yield}) \div (\text{max yield}) \quad \text{Equation (4)}$$

The term "substantially constant yield" refers to a percentage difference (% Δ) between maximum and minimum yields of less than about 10 percent, preferably less than about 5 percent, more preferably less than about 3.5 percent, and most preferably less than about 2.5 percent, as measured over a time appropriate to process application and optionally reactor size. For example, in processes operating up to about 10 hours, an appropriate time measurement is about 60 minutes, preferably, the first 60 minutes from inception of the process. Such processes are applicable to small-scale fuel reformers suitable for use with fuel cells in automotive applications. In these instances, the difference in maximum and minimum yields is beneficially less than about 10 percent, preferably, measured over the first 60 minutes of operation. In contrast, fuel reformers sized for use in chemical plants might take days to reach steady state and might operate for many weeks; and therefore, an appropriate time for measuring the percentage difference in maximum and minimum yields, may be taken as about 7 days, preferably if possible, about the first 7 days from inception of the process.

In one preferred embodiment, the process of this invention comprises:
(a) feeding a hydrocarbon fuel into a reactor, the hydrocarbon fuel being fed in a pulsed on-off mode;
(b) feeding an oxidant into the reactor, the hydrocarbon fuel and oxidant being fed in a fuel-rich ratio;
(c) contacting the hydrocarbon fuel and oxidant with a catalyst in the reactor for a fuel-rich cycle-time sufficient to produce at least one partially-oxidized reaction product;
(d) decreasing or stopping the feed of hydrocarbon fuel to the reactor while maintaining the feed of oxidant to the reactor to produce a fuel-lean feed ratio of hydrocarbon fuel to oxidant;
(e) maintaining the fuel-lean feed ratio for a fuel-lean cycle-time sufficient to reduce coke deposits while maintaining a substantially constant yield of partially-oxidized reaction product;
(f) increasing the feed of hydrocarbon fuel to the reactor while maintaining the feed of oxidant to the reactor so as to provide a fuel-rich feed ratio of hydrocarbon fuel to oxidant in the manner of steps (a) and (b); and reiterating process steps (c) through (f).

In another embodiment of this invention, process steps (a) through (f) are conducted in the absence of co-fed water or steam.

In a preferred embodiment, the hydrocarbon fuel comprises any distillate fuel, more preferably, light oil (diesel fuel). The preferred oxidant comprises air. The preferred catalyst comprises an ultra-short-channel-length metal mesh substrate having deposited thereon one or more noble metals. These and other preferred aspects of the process are described in detail hereinafter.

The hydrocarbon fuel comprises any hydrocarbon capable of participating in a partial oxidation reforming reaction to produce a partially-oxidized reaction product, preferably, a hydrogen-containing fuel gas, more preferably, a fuel comprising diatomic hydrogen, such as syngas. As known in the art, the term "hydrocarbon" refers to an organic compound consisting essentially of carbon and hydrogen, including alkanes, aromatics, and cycloaromatics. For the purposes of this invention, the aforementioned definition is expanded to include "alcohols," which are known in the art to comprise not only carbon and hydrogen but also one or more hydroxyl groups (—OH), each hydroxyl group being bonded to a carbon atom. Specific non-limiting examples of hydrocarbon fuels suitable for the process of this invention include commercial and military distillate fuels, including for example, gasoline, light oil (diesel fuel), biodiesel fuel, natural gas, ethane, propane, and alcohols, preferably $C_{1-20}$ alcohols, more preferably methanol and ethanol, and any mixture of the aforementioned compounds. Among these, light oil (diesel fuel) is preferred.

The oxidant employed in the process of this invention comprises any compound capable of providing one or more oxygen atoms reactive towards the hydrocarbon fuel. This invention is not limited with respect to the oxidant so long as the effect of the invention is achieved. Suitable non-limiting examples of the oxidant include air, oxygen-rich air, essentially pure oxygen, and gas mixtures comprising oxygen and nitrogen as main components, the latter meaning that oxygen and nitrogen are each in a higher concentration relative to other gaseous components. As other gaseous components, these are preferably non-reactive in the partial oxidation process and not inhibiting of the catalyst, and can include, for example, helium, argon, and other inert gases. Among the aforementioned examples, the preferred oxidant consists of air or gas mixtures comprising oxygen and nitrogen as main components.

The fuel-rich oxidation step (c) of this invention is operated within a feed ratio of hydrocarbon fuel to oxidant wherein partial oxidation can occur per Equation (2) hereinabove. In order to achieve partial oxidation, the feed ratio of hydrocarbon fuel to oxidant should fall within a fuel-rich range, which means that the equivalence ratio defined hereinbefore is greater than 1:1. Preferably, the equivalence ratio for fuel-rich operation ranges from about 1.02:1 to about 10:1.

Since partial oxidation is an exothermic process, heat generated in the process can be effectively integrated into the process itself or into another downstream process. Given the size and operating temperature of the catalytic reactor and the specific catalyst and catalyst loading, one skilled in the art would know how to select a hydrocarbon fuel to oxidant molar ratio that satisfies both the fuel-rich requirement for step (c) of the process and effectively integrates the exothermic heat of reaction for the desired use.

The fuel-rich oxidation of step (c) is controlled within an operating temperature ranging from about 600° to about 1,100° C., preferably, within a range from about 850° C. to about 1,050° C. The maximum temperature is chosen to facilitate durability of the reactor, catalyst, and substrate materials. The pressure in the catalytic reactor can range from sub-atmospheric to super-atmospheric; operation about atmospheric may be preferred. It is noted that the extent of coking will vary as a function of pressure. Based on the description provided herein, one skilled in the art will know how to vary appropriately the process parameters of this invention to achieve the desired partial oxidation and decoking at the selected operating pressure.

As contemplated for this process invention, the reactor can have any conventional configuration and design, provided that the effect of the invention is achieved, specifically, catalytic partial oxidation with in-situ coke removal. A preferred reactor configuration comprises a flow reactor wherein the catalyst is provided as a pelleted solid in a fixed-bed, or alternatively, wherein the catalyst is provided as a catalyst-coated monolith substrate or a catalyst-coated Microlith® brand substrate. The latter substrates may be provided in the form of a screen, mesh, or foam. Other metallic ceramic supports known in the art may also be contemplated as a suitable substrate. Any one or more catalyst or catalytic components are suitably employed, provided that catalytic partial oxidation is achieved, suitable non-limiting examples of which include one or a combination of noble metals as well as solid oxides, such as perovskites.

Preferred reactor configurations are described in U.S. Pat. Nos. 5,051,241; 6,746,657; US Patent Application publication No. 2008/127553; US Patent Application publication No. 2007/151154; and International Application publication No. WO 2004-A2-060546, the aforementioned citations being incorporated herein by reference. A more preferred reactor having millisecond order response times for fuel delivery is described in US-A1-2009/0252661, also incorporated herein by reference.

Preferably, the partial oxidation catalyst is provided as a Microlith® brand substrate, in mesh form, upon which one or more catalytic metals are deposited via wet chemistry procedures. The preferred Microlith® brand catalyst, which is commercially available from Precision Combustion, Inc., located in North Haven, Conn., USA, comprises one or more ultra-short-channel-length metal elements, most preferably, in a mesh construction, having one or more noble metals deposited thereon. For the purposes of this invention, the term "ultra-short-channel-length" refers to channel lengths in a range from about 25 microns (μm) (0.001 inch) to about 500 μm (0.020 inch). The noble metals include palladium, platinum, rhodium, iridium, ruthenium, osmium, silver, and gold. The Microlith® brand ultra-short-channel-length metal mesh substrate is described in U.S. Pat. Nos. 5,051,241, 6,156,444, and 6,746,657, all references incorporated herein by reference.

In the process of this invention, the oxidant and hydrocarbon fuel are fed through independent inlet nozzles, one or both of which can be fast-acting valves capable of on-off switching on the order of milliseconds to seconds. In one preferred embodiment, the oxidant is fed through an inlet nozzle in continuous flow to the reactor; while the hydrocarbon fuel is fed to the reactor through a fast-acting valve capable of the fuel-rich (fuel-on) and fuel-lean (fuel-reduced or fuel-off) cycle-times described hereinafter. Optionally, the fast-acting valve may deliver the hydrocarbon fuel in a pulsed on-off mode, which involves a fast pulsed on-off fuel injection interval on the order of 3 to about 50 milliseconds (ms) upon which is superimposed the longer fuel-rich cycle. Suitable fast-acting valves include injectors such as those described in U.S. Patent Application publication No. 2004/209205A1, incorporated herein by reference, as well as piezoelectric nozzles. Such injectors typically feed the fuel in a pulsed stream or plurality of pulsed streams, preferably, one or more pulsed liquid streams or pulsed droplets.

When the hydrocarbon fuel is delivered in a pulsed on-off mode, the pulse on-off cycle (i.e., the total unit interval that fuel is pulsed on and off) ranges from about 3 milliseconds (ms) to about 50 ms, which corresponds to an on-off pulse frequency ranging from about 20 Hz (20 sec$^{-1}$) to about 333 Hz (333 sec$^{-1}$). The portion of time in which fuel is fed during the pulse on-off cycle is referred to as the "duty ratio." Advantageously, the duty ratio ranges from greater than about 20 percent, preferably, from greater than about 30 percent, to less than about 80 percent, preferably, less than about 50 percent of the pulse on-off cycle. Duty ratios more or less than these may also be suitable. When operating fuel delivery in pulsed on-off mode, the ratio of total moles of fuel to total moles of air fed over the cycle (unit interval) determines whether the feed is fuel-rich or fuel-lean. For step (c) of the process the ratio must be fuel-rich.

The process of this invention preferably operates in the absence of co-fed water or steam. If water or steam were to be co-fed to the process, the hydrocarbon fuel would engage in steam reforming and steam decoking reactions. Even in the absence of co-fed water or steam, some of the hydrocarbon fuel may be oxidized to deep oxidation products ($CO_2$+$H_2O$); therefore some water may be present in the reactor. Notably, however, under the operating conditions of this invention, partial oxidation predominates and steam reforming of any sort is not only minimal but insufficient to reduce coke deposits to an acceptable level or to eliminate coke altogether.

The hydrocarbon fuel and oxidant are mixed in a mixer section of the reactor to form the fuel-rich fuel-oxidant mixture that is subsequently contacted with the catalyst. The catalyst is heated, typically using a glow plug, to a temperature sufficient to "light-off" the catalyst. Optionally, the flow of oxidant and/or flow of hydrocarbon fuel can be pre-heated to raise the temperature of the catalyst. After the catalyst is lit-off, the partial-oxidation process becomes self-sustaining and may need no further external heat input.

The catalytic partial oxidation is allowed to proceed in fuel-rich feed mode for a fuel-rich cycle-time and other process conditions sufficient to produce at least one catalytic partial oxidation product, preferably, diatomic hydrogen. Advantageously, the fuel-rich cycle-time is also designed to limit the build-up of coke deposits. Significant build-up of coke is evidenced by a spike in process temperature when the hydrocarbon fuel is shut off. As general guidance, the fuel-rich cycle-time is preferably maintained for a time greater than about 15 seconds, but less than a time that would produce a temperature greater than about 1,050° C. when the hydrocarbon fuel is shut-off. More preferably, the fuel-rich cycle-time is maintained in a range from about 20 seconds (sec) to about 20 minutes (min), preferably, from about 20 sec to about 10 min, more preferably, from about 20 sec to about 5 min.

As a consequence of reforming the hydrocarbon fuel, coke is produced as a byproduct. Over time coke deposits would build up on the catalyst and on the interior surfaces, walls, fixtures, and conduits within the reactor producing the problems mentioned hereinbefore. The process of this invention features in-situ coke removal during operation of the catalytic partial oxidation process. The in-situ coke removal avoids shutting-down the partial oxidation process for a separate oxygen burn-off or steam decoking step, which would significantly interrupt the instantaneous yield and decrease the average yield of partially-oxidized reaction product. Thus, the in-situ coke removal aspect of this invention is effected by step (d) varying the feed of hydrocarbon fuel, or the oxidant feed, or both feeds to produce a fuel-lean feed of hydrocarbon fuel and oxidant having an equivalence ratio less than 1:1, and step (e) maintaining the fuel-lean feed to the reactor for a fuel-lean cycle-time sufficient to reduce coke deposits while maintaining a substantially constant yield of partially-oxidized reaction product. Clearly, the fuel-lean feed to the reactor can be obtained either by reducing the feed of hydrocarbon fuel, or by increasing the feed of oxidant, or by some appropriate manipulation of both feeds, such that the equivalence ratio transitions from fuel-rich to fuel-lean. In a preferred embodiment, the feed of hydrocarbon fuel is decreased or stopped completely while maintaining a continuous feed of oxidant. In a more preferred embodiment, the feed of hydrocarbon fuel is stopped, that is shut off, while maintaining a continuous feed of oxidant so as to produce the fuel-lean feed to the reactor. Under fuel-lean feed conditions, the equivalence ratio can vary from 0:1 to any value less than 1:1.

Preferably, the fuel-lean cycle-time (coke removal cycle-time) is of a sufficiently long duration to reduce and/or remove coke deposits and of a sufficiently short duration to maintain a substantially constant yield of partially-oxidized reaction product. Preferably, the substantially constant yield maintains the percentage difference (% Δ) between maximum and minimum yields, as defined in Equation (4) herein, to less than about 10 percent, preferably, less than about 5 percent, more preferably, less than about 3.5 percent, and most preferably, less than about 2.5 percent over the appropriate time period noted hereinbefore. It is further preferred to maintain a fuel-lean cycle-time shorter than a time that allows for oxygen break-through into the reactor effluent stream. Oxygen break-through, however, may be difficult to detect, because at operating temperatures of this process oxygen tends to react with hydrogen product. When the hydrocarbon fuel is fed to the reactor in pulsed on-off mode, the fuel-lean cycle-time is preferably longer than the on-off pulse cycle. Advantageously, the fuel-lean cycle-time is greater than about 5 ms, preferably greater than about 75 ms, and more preferably greater than about 100 ms. Advantageously, the fuel-lean cycle-time is less than about 2,000 ms, preferably, less than about 1,000 ms, and more preferably, less than about 800 ms.

Other process conditions employed during the fuel-lean cycle-time are those also sufficient to remove coke while maintaining a substantially constant yield of partially-oxidized reaction product. During coke removal, the minimum temperature in the reactor is maintained preferably greater than about 600° C., more preferably, greater than about 850° C., while not exceeding a temperature of about 1,050° C., preferably, not exceeding about 1,020° C.

After the fuel-lean cycle-time is completed, the feed of hydrocarbon fuel, the oxidant feed, or both feeds are re-established as in steps (a) and (b) to produce a fuel-rich feed to the reactor. If the hydrocarbon fuel was reduced or stopped in process step (d), then the feed of fuel is re-established per step (a), and may optionally, be re-established in pulsed on-off mode as desired. The fuel-rich feed is maintained for another round of fuel-rich partial oxidation for a fuel-rich cycle-time per process step (c); which is then followed by another round of (d) fuel-lean feed for the fuel-lean cycle-time, and so on. The process steps (a) through (f) are reiterated by alternating between the fuel-rich and fuel-lean feed cycles, respectively, throughout the duration of the process.

Since it is undesirable to shut-down or dismantle the catalytic partial oxidation process, an indirect method of examination can be employed to measure the extent of coke deposits or, alternatively, the success of coke removal by the method of this invention. Specifically, the yield of partially-oxidized reaction product is monitored as a function of process time-on-stream from which the instantaneous yields and average yield are obtained as defined hereinbefore. Generally, coke buildup is inferred from observation of a reduction in the average yield of partially-oxidized product as compared with the previous average yield measurement; whereas a reduction of coke is inferred from observation of an increase in or maintenance of the average yield of partially-oxidized product as compared with the previous average yield measurement. Average yield is a somewhat better measurement than instantaneous yield, because the latter may vary more particularly at longer fuel-lean cycle-times.

Standard analytical methods, such as gas chromatography (gc) or gc-mass spectrometry, can be used to identify and quantify the partially-oxidized reaction product, preferably diatomic hydrogen, in the effluent from the reactor. In the determination of maximum yield, minimum yield, and average yield, it is advantageous to exclude data taken during process warm-up or equilibration. It has been found that the process exhibits wide variation, if not spikes, in yield output during the warm-up period, which can inappropriately skew the average yield calculation. As general guidance, the warm-up period can be taken as the time leading up to the maximum yield. For the application illustrated in the Examples provided in this disclosure, a warm-up period of at least about 12 minutes up to about 15 minutes of operation was allowed to establish steady state process operation, after which the data points were used to obtain reliable yield measurements.

At any given time, the process of this invention advantageously achieves an average yield of partially-oxidized reaction product, preferably, diatomic hydrogen, of greater than about 50 mole percent, preferably, greater than about 60 mole percent, and more preferably, greater than about 70 mole percent, based on the moles of hydrogen fed to the reactor in the form of hydrocarbon fuel. Moreover, the average yield of partially-oxidized product obtainable at the most preferred fuel-lean cycle-time of greater than about 100 ms and less than about 800 ms tends to be about 3 percent or more than 3 percent higher than the average yield obtainable at a fuel-lean cycle-time outside this range.

As a further advantage, in preferred embodiments of this invention employing a fuel-lean cycle-time greater than about 100 ms and less than about 800 ms, the yield at any given time (instantaneous yield) of partially-oxidized reaction product exhibits substantially constant behavior over a short time frame on the order of minutes. In these preferred embodiments, the percentage difference in the maximum and minimum yields is advantageously less than about 3.0 percent, preferably, less than about 2.5 percent. At long fuel-lean cycle-times greater than about 1,000 ms, variations in yield are more pronounced. Even more advantageously, in preferred embodiments of this invention the average yield of partially-oxidized reaction product is substantially constant over a long time frame on the order of at least about 1 hour, with the variation in yield showing less than 1.5 percent difference between maximum and minimum yields.

The following examples are provided as an illustration of the invention; however, such examples are not intended to be limiting thereof.

EXAMPLE 1(a-q)

A catalytic partial oxidation reactor was fitted with a Microlith® brand catalyst obtained from Precision Combustion, Inc. of North Haven, Conn. The catalyst comprised an ultra-short-channel-length metal mesh substrate upon which a mixture of noble metals was deposited. A flow of air (17 slpm) and a flow of low-sulfur diesel fuel (4.3 g/min) were fed to the reactor at a fuel-rich equivalence ratio of 3.3:1. The fuel flow was fed through a fast-acting valve operating in pulsed mode at a frequency of 200 Hz for a pulsed on-off cycle of 5 ms during which time fuel was fed for a duty cycle of 37 percent of the time. The flow of fuel and oxidant were mixed in a mixer portion of the reactor, and a glow plug was used to raise the temperature of the catalyst to light-off. The catalytic partial oxidation process continued spontaneously throughout the duration of the run in producing a mixture of hydrogen and carbon monoxide.

The pulsed mode fuel flow was continued for 30 seconds, after which the fuel flow was shut off to produce a fuel-lean feed of equivalence ratio 0:1. The fuel-lean feed mode was maintained for a fuel-lean cycle-time ranging from 5 ms to 2,000 ms as shown in Table 1. During the fuel-lean cycle, air flow was continuously fed uninterrupted to the reactor. After completion of the fuel-lean cycle, the pulsed mode fuel flow was restarted, and the resulting fuel-rich feed was maintained for a fuel-rich cycle-time of 30 seconds. Thereafter, the fuel flow was again shut off for the fuel-lean cycle-time; and the process of fuel-rich feed followed by fuel-lean feed was reiterated for the duration of the run (run time). The air flow was maintained throughout the run.

Figure 1:
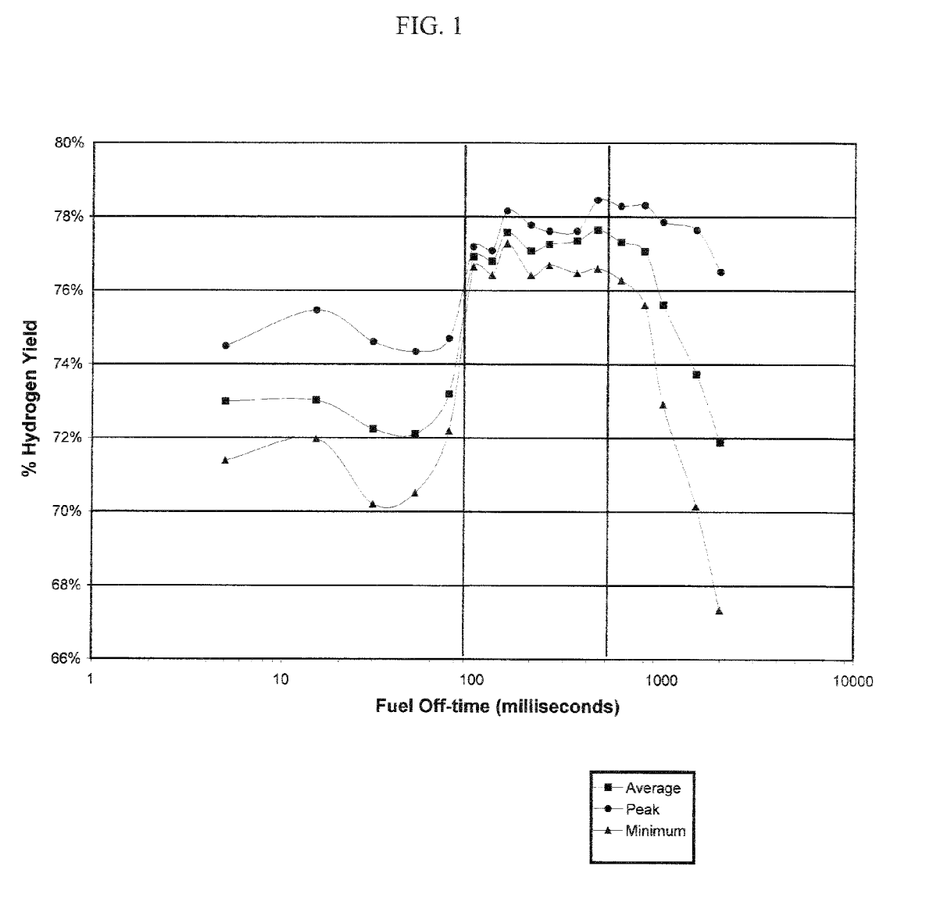
FIG. 1 depicts a graph of Percentage Hydrogen Yield versus Fuel-Off Time for an embodiment of the process of this invention.

The effluent stream from the reactor was analyzed by gas chromatography (gc) for the presence of diatomic hydrogen. The maximum temperature of the process was measured. The yield of diatomic hydrogen was measured as a function of fuel-lean cycle-time from which the Maximum Yield, the Minimum Yield, % Difference (% Δ) and the Average Yield were taken or calculated. Results are shown in Table 1 and FIG. 1.

TABLE 1

Yield of Hydrogen as a Function of Fuel-lean Cycle-time[1,2]

| Expt. | Fuel-Lean Cycle (ms) | Run Time (hr) | Max T (° C.) | Max Yield (%) | Min Yield (%) | Δ Yield (Max − Min) | % Δ | Average Yield (%) |
|---|---|---|---|---|---|---|---|---|
| E-1(a) | 5 | 1:00 | 989 | 74.5 | 71.4 | −3.1 | −4.2 | 73.0 |
| E-1(b) | 15 | 1:00 | 1020 | 75.5 | 72.0 | −3.5 | −4.6 | 73.0 |
| E-1(c) | 30 | 1:00 | 1019 | 74.6 | 70.2 | −4.4 | −5.9 | 72.2 |
| E-1(d) | 50 | 1:06 | 1012 | 74.3 | 70.5 | −3.8 | −5.1 | 72.1 |
| E-1(e) | 75 | 1:02 | 997 | 74.7 | 72.2 | −2.5 | −3.3 | 73.2 |
| E-1(f) | 100 | 0:58 | 991 | 77.2 | 76.6 | −0.6 | −0.6 | 76.9 |
| E-1(g) | 125 | 1:04 | 990 | 77.1 | 76.4 | −0.7 | −0.9 | 76.8 |
| E-1(h) | 150 | 1:03 | 990 | 78.2 | 77.3 | −0.9 | −1.2 | 77.6 |
| E-1(i) | 200 | 1:05 | 1000 | 77.8 | 76.4 | −1.4 | −1.8 | 77.1 |
| E-1(j) | 250 | 0:47 | 1000 | 77.6 | 76.7 | −0.9 | −1.2 | 77.2 |
| E-1(k) | 350 | 0:58 | 1000 | 77.6 | 76.5 | −1.1 | −1.4 | 77.3 |
| E-1(l) | 450 | 1:01 | 1000 | 78.5 | 76.6 | −1.9 | −2.4 | 77.6 |
| E-1(m) | 600 | 0:36 | 1000 | 78.3 | 76.3 | −2.0 | −2.6 | 77.3 |
| E-1(n) | 800 | 1:02 | 1000 | 78.3 | 75.6 | −2.7 | −3.4 | 77.1 |
| E-1(o) | 1000 | 1:00 | 1010 | 77.9 | 72.9 | −5.0 | −6.4 | 75.6 |
| E-1(p) | 1500 | 1:00 | 1007 | 77.6 | 70.2 | −7.4 | −9.5 | 73.7 |
| E-1(q) | 2000 | 1:06 | 1007 | 76.5 | 67.3 | −9.2 | −12.0 | 71.9 |

[1]Process Conditions: Airflow, 17.7 slpm; Fuel Flow, 4.3 g/min; equivalence ratio, 3.3/1; Fuel pulse mode, 200 Hz; duty cycle, 37%; Fuel-rich cycle-time, 30 sec.
[2]Data within the first 14 minutes of operation were excluded. Max Yield = highest yield after warm-up time of 14 min; Min Yield = lowest yield after the max yield in first ~60 minutes of operation, except for times noted in E-1(j) and E-1(m).

From Table 1 it is seen that the process temperature did not exceed 1050° C. Moreover from Table 1 and FIG. 1, it is seen that a fuel-lean cycle-time between 100 ms and 1,000 ms provided an optimal average yield of diatomic hydrogen ranging from 75.6% to 77.6%. Likewise, the percentage difference in maximum and minimum yields tended to be smaller at a fuel-lean cycle-time greater than 75 ms and less than 1,000 ms.

Table 2 tabulates hydrogen yield as a function of process time-on-stream and fuel-lean cycle-time for Examples E-1 (a), E-1(e), E-1(f), E-1(g), E-1(l), and E-1(o).

TABLE 2

Yield (%) as function of Time-on-Stream and Fuel-Lean Cycle-time

| Time (min) | 5 ms E-1(a) | 75 ms E-1(e) | 100 ms E-1(f) | 125 ms E-1(g) | 450 ms E-1(l) | 1000 ms E-1(o) |
|---|---|---|---|---|---|---|
| 2.00 | | | | 72.6 | | |
| 2.50 | | 71.2 | | | | |
| 4.00 | 73.5 | | | | | |
| 4.00 | | | 69.6 | | | |
| 5.32 | | | | 75.0 | | |
| 7.32 | 73.9 | | | | | |
| 7.33 | | | 74.6 | | | |
| 8.42 | | 74.5 | | | | |
| 8.58 | | | | 76.3 | | |
| 10.57 | 74.4 | | | | | |
| 10.58 | | | 75.6 | | | |
| 11.47 | | | | | | 72.9 |
| 12.23 | | | | 76.3 | | |
| 13.22 | | 74.7 | | | | |
| 13.30 | | | | | 77.0 | |
| 14.18 | | | 76.7 | | | |
| 14.18 | 74.5 | | | | | |
| 14.78 | | | | | | 72.7 |

TABLE 2-continued

Yield (%) as function of Time-on-Stream and Fuel-Lean Cycle-time

| Time (min) | 5 ms E-1(a) | 75 ms E-1(e) | 100 ms E-1(f) | 125 ms E-1(g) | 450 ms E-1(l) | 1000 ms E-1(o) |
|---|---|---|---|---|---|---|
| 17.03 | | | | 77.1 | | |
| 18.08 | | | | | 76.3 | |
| 18.25 | | | | | | 76.6 |
| 18.48 | | 74.4 | | | | |
| 18.98 | | | 77.2 | | | |
| 18.98 | 74.4 | | | | | |
| 21.57 | | | | | | 72.9 |
| 22.37 | | | 76.9 | | | |
| 22.88 | | | | 77.9 | | |
| 23.27 | | 73.8 | | | | |
| 23.77 | 73.9 | | | | | |
| 24.32 | | | 77.2 | | | |
| 24.90 | | | | | | 76.3 |
| 27.13 | | | 77.0 | | | |
| 27.67 | | | | | 77.5 | |
| 28.25 | | | | | | 73.9 |
| 28.52 | | 74.0 | | | | |
| 29.03 | 73.4 | | | | | |
| 29.12 | | | 77.1 | | | |
| 31.57 | | | | | | 76.2 |
| 32.42 | | | | 76.8 | | |
| 32.93 | | | | | 77.3 | |
| 33.32 | | 73.0 | | | | |
| 33.82 | 73.2 | | | | | |
| 33.90 | | | 76.8 | | | |
| 34.90 | | | | | | 76.4 |
| 37.22 | | | | 76.8 | | |
| 37.73 | | | | | 78.3 | |
| 38.23 | | | | | | 75.0 |
| 38.57 | | 72.8 | | | | |
| 39.07 | 72.9 | | | | | |
| 39.15 | | | 76.8 | | | |
| 41.55 | | | | | 77.9 | |
| 42.02 | | | | 76.8 | | |
| 42.98 | | | | | 76.6 | |
| 43.37 | | 72.3 | | | | |
| 43.87 | 72.5 | | | | | |
| 43.93 | | | 76.8 | | | |
| 44.87 | | | | | | 73.6 |
| 47.27 | | | | 76.4 | | |
| 47.78 | | | | | 78.0 | |
| 48.17 | | 72.2 | | | | |
| 48.20 | | | | | | 77.3 |
| 49.13 | 72.0 | | | | | |
| 49.27 | | | 76.8 | | | |
| 51.52 | | | | | | 73.5 |
| 52.07 | | | 76.8 | | | |
| 53.05 | | | | | 77.5 | |
| 53.42 | | 72.5 | | | | |
| 53.93 | 71.7 | | | | | |
| 54.07 | | | 76.6 | | | |
| 54.83 | | | | | | 76.4 |
| 57.32 | | | | 76.6 | | |
| 57.85 | | | | | 77.8 | |
| 58.15 | | | | | | 75.7 |
| 58.22 | | 72.2 | | | | |
| 59.18 | 71.4 | | | | | |
| 61.48 | | | | | | 75.2 |
| 62.10 | | | 76.8 | | | |

Figure 2:
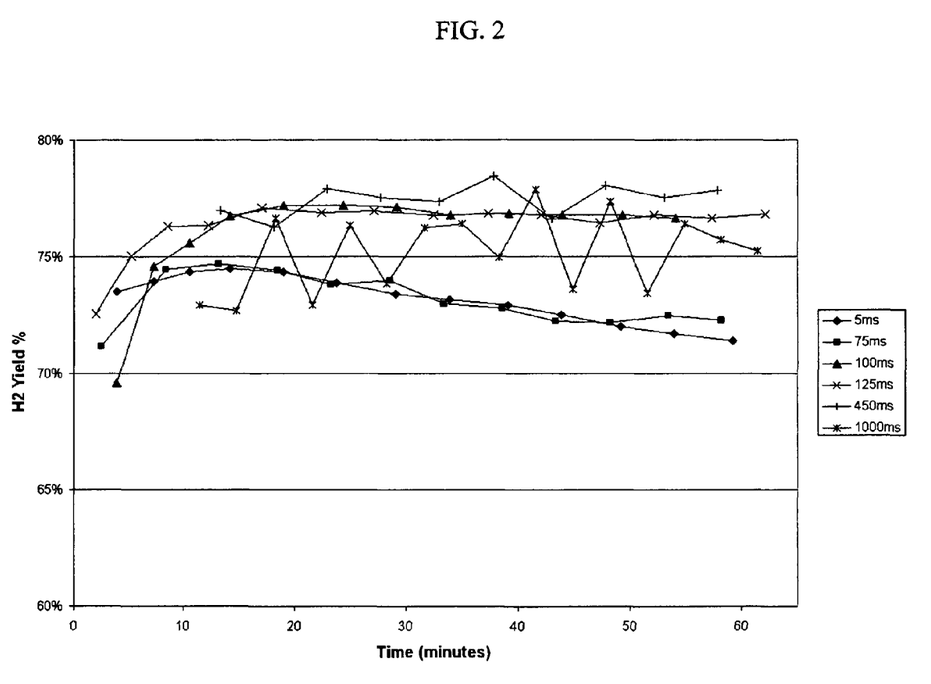
FIG. 2 depicts a graph of Percentage Hydrogen Yield versus Time (process operating time) for an embodiment of the process of this invention.

The data in Table 2 are graphed in FIG. 2, where it is seen that for up to 60 minutes of operating time, the hydrogen yield is higher by about 3 percent when the fuel-lean cycle-time ranges from 100 ms to 1,000 ms. Moreover, the instantaneous yield is essentially flat over the process run for the examples at 100 ms, 125 ms, and 450 ms. At shorter cycle-times, the yield decreases slowly with time, but remains within the broad definition of "substantially constant." At the higher cycle-time of 1,000 ms, the instantaneous yield shows variation, but the average yield is essentially flat over the run time. In contrast to the above, had the fuel been shut off for minutes or hours for a separate coke burn-off as described in the prior art, the instantaneous yield of partially-oxidized product would have dropped to zero with significant negative impact on the average yield.

The actual lower and upper boundaries for the fuel-lean cycle-time are expected to vary depending upon the selected fuel and operating conditions, including the fuel-rich cycle-time, the on-off pulse cycle and duty cycle if any, the process temperature and pressure, and the fuel and oxidant flow rates. A person skilled in the art can readily determine the lower and upper boundaries for the fuel-lean cycle-time from the guidance given herein and by preparing a reference graph analogous to the graph shown in FIG. 1 for the selected operating conditions.

While the present invention has been described in considerable detail, other configurations exhibiting the characteristics taught herein are contemplated for the instant process of catalytic partial oxidation with in-situ coke removal. Therefore, the spirit and scope of the invention should not be limited to the description of the preferred embodiments described herein.

The invention claimed is:

1. A process of catalytic partial oxidation with in-situ coke removal, the process comprising:
   (a) feeding a hydrocarbon fuel into a reactor;
   (b) feeding an oxidant into the reactor, the hydrocarbon fuel and oxidant being fed in a fuel-rich feed ratio;
   (c) contacting the hydrocarbon fuel and oxidant in the reactor with a catalyst consisting essentially of a partial oxidation catalyst capable of converting the hydrocarbon into hydrogen and carbon monoxide, the contacting occurring at a temperature between 850° C. and 1,050° C. for a fuel-rich cycle time sufficient to produce hydrogen and carbon monoxide, and further wherein the fuel-rich cycle time is greater than 15 seconds but less than a time that would produce a temperature greater than 1,050° C. when the hydrocarbon fuel is shut off;
   (d) varying the feed of hydrocarbon fuel, or the feed of oxidant, or both feeds to the reactor to produce a fuel-lean feed ratio of hydrocarbon fuel to oxidant;
   (e) maintaining the fuel-lean feed ratio at a temperature greater than 850° C. and less than 1,050° C. for a fuel-lean cycle-time greater than 100 milliseconds and less than 800 milliseconds so as to reduce coke deposits while maintaining a substantially constant yield of partially-oxidized reaction product;
   (f) varying the feed of hydrocarbon fuel, or the feed of oxidant, or both feeds to the reactor so as to provide a fuel-rich feed ratio in the manner of steps (a) and (b); and reiterating process steps (c) through (f);
   and further wherein all process steps are conducted in the absence of co-fed water or steam.

2. The process of claim 1 wherein the oxidant comprises air, oxygen-enriched air, essentially pure oxygen, or a gas mixture comprising oxygen and nitrogen as main components.

3. The process of claim 1 wherein the hydrocarbon fuel is selected from the group consisting of gasoline, light oil (diesel fuel), biodiesel fuel, natural gas, ethane, propane, and alcohols.

4. The process of claim 1 wherein in process steps (a) and (b) an equivalence ratio of hydrocarbon fuel to oxidant fed to the reactor is greater than 1:1.

5. The process of claim 1 wherein the hydrocarbon fuel is fed to the reactor in a pulsed on-off cycle.

6. The process of claim 5 wherein the pulsed on-off cycle ranges from about 5 milliseconds to about 50 milliseconds.

7. The process of claim 6 wherein a duty ratio, which is the total time that the hydrocarbon fuel is fed to the reactor during the pulsed on-off cycle, ranges from 20 percent to 80 percent of the pulsed on-off cycle.

8. The process of claim 1 wherein in step (d) the feed of hydrocarbon fuel is decreased or stopped while the oxidant feed is maintained to produce a fuel-lean feed ratio of fuel to oxidant to the reactor.

9. The process of claim 1 wherein in step (d) the oxidant feed is increased while the feed of hydrocarbon fuel is maintained to produce a fuel-lean feed ratio of fuel to oxidant to the reactor.

10. The process of claim 1 wherein in step (d) the hydrocarbon fuel and oxidant are fed to the reactor in an equivalence ratio less than 1:1.

11. The process of claim 1 wherein the partial oxidation catalyst consists essentially of an ultra-short-channel-length metal mesh substrate having one or more noble metals deposited thereon, wherein the ultra-short-channel-length ranges from 25 microns to 500 microns.

12. The process of claim 11 wherein the hydrocarbon fuel is diesel fuel and the oxidant is air.

13. The process of claim 1 wherein a substantially constant yield refers to a percentage difference between maximum and minimum yields of partially-oxidized reaction product of less than 10 percent over the first 60 minutes of process operation.

14. The process of claim 1 wherein the fuel-rich cycle time is greater than 20 seconds and less than 10 minutes.

15. In a catalytic partial oxidation process wherein a hydrocarbon fuel and an oxidant are fed into a reactor and contacted with a catalyst under catalytic partial oxidation conditions sufficient to produce hydrogen and carbon monoxide; the improvement comprising:
  (i) employing a catalyst consisting essentially of a partial oxidation catalyst capable of converting a hydrocarbon into hydrogen and carbon monoxide;
  (ii) varying the feed of hydrocarbon fuel, or the feed of oxidant, or both feeds to produce a fuel-rich feed ratio of hydrocarbon fuel to oxidant to the reactor; and maintaining the fuel-rich feed ratio at a temperature between 850° C. and 1,050° C. for a fuel-rich cycle-time sufficient to produce hydrogen and carbon monoxide, and further wherein the fuel-rich cycle time is greater than 15 seconds but less than a time that would produce a temperature greater than 1,050° C. when the hydrocarbon fuel is shut off;
  (iii) varying the feed of hydrocarbon fuel, or the feed of oxidant, or both feeds to produce a fuel-lean feed ratio of hydrocarbon fuel to oxidant to the reactor; and maintaining the fuel-lean feed ratio at a temperature greater than 850° C. and less than 1,050° C. for a fuel-lean cycle-time greater than 100 milliseconds and less than 800 milliseconds so as to remove coke deposits and to maintain a substantially constant yield of partially-oxidized reaction product; and
  (iv) reiterating process steps (i) to (iii) throughout the process;
  and further wherein the aforementioned process steps are conducted in the absence of co-fed water or steam.

\* \* \* \* \*